(12) United States Patent
Matsuda (10) Patent No.: US 8,199,624 B2
(45) Date of Patent: Jun. 12, 2012

(54) OPTICAL DISC, OPTICAL DISC UNIT AND METHOD OF CONTROLLING THE OPTICAL DISC UNIT

(75) Inventor: Takahiro Matsuda, Yokohama (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 885 days.

(21) Appl. No.: 12/057,418

(22) Filed: Mar. 28, 2008

(65) Prior Publication Data
US 2008/0298193 A1    Dec. 4, 2008

(30) Foreign Application Priority Data
Jun. 1, 2007 (JP) ................................. 2007-146432

(51) Int. Cl.
| | |
|---|---|
| G11B 5/55 | (2006.01) |
| G11B 7/125 | (2006.01) |
| G11B 5/00 | (2006.01) |
| G11B 7/12 | (2006.01) |
| G11B 7/20 | (2006.01) |
| G11B 7/00 | (2006.01) |

(52) U.S. Cl. ....... 369/53.28; 369/47.5; 369/94; 369/116
(58) Field of Classification Search ................ 369/47.5, 369/47.51, 47.55, 116, 53.28, 44.28, 44.29, 369/53.3, 94, 53.26, 53.27
See application file for complete search history.

(56) References Cited

U.S. PATENT DOCUMENTS
| | | | | |
|---|---|---|---|---|
| 5,608,715 A | * | 3/1997 | Yokogawa et al. | ........ 369/275.1 |
| 2003/0137915 A1 | * | 7/2003 | Shoji et al. | ................. 369/59.25 |

FOREIGN PATENT DOCUMENTS
| | | |
|---|---|---|
| JP | 9-50630 | 2/1997 |
| JP | 11-345420 | 12/1999 |

* cited by examiner

*Primary Examiner* — Joseph Haley
*Assistant Examiner* — Nicholas Lee
(74) *Attorney, Agent, or Firm* — Antonelli, Terry, Stout & Kraus, LLP.

(57) ABSTRACT

When a laser light focal point, driven by an objective lens, passes through each of a plurality of recording layers of an optical disc, data recorded on the recording layers through which the focal point passes may be deteriorated due to a difference in optical sensitivity for each recording layer or the like. In a focal point position movement in which switching of recording layers is made by a focus error signal, when the focal point position moves from a recording layer on which a laser light is focused to another recording layer which is not adjacent, light intensity or light density at the focal point is reduced in accordance with the recording layer to be passed through, thus deterioration of the data on the optical disc being prevented.

9 Claims, 6 Drawing Sheets

OPTICAL DISC, OPTICAL DISC UNIT AND METHOD OF CONTROLLING THE OPTICAL DISC UNIT

INCORPORATION BY REFERENCE

The present application claims priority from Japanese application JP2007-146432 filed on Jun. 1, 2007, the content of which is hereby incorporated by reference into this application.

BACKGROUND OF THE INVENTION

The present invention relates to an optical disc unit for recording and reproducing data on and from an optical disc that has a plurality of recording layers.

A digital versatile disc (referred to as DVD hereinafter) that is currently standardized has two layers on one surface thereof. When the two layers are formed on one surface, recording layers are previously laminated on each of two discs having a thickness of 0.6 mm. A disc with an aluminum film having a high reflection rate and a disc with a translucent metal reflection film are bonded together. Thus, it is possible to access the plurality of recording layers from one surface.

Access to each recording layer can be made and thereby information recorded thereon can be read by moving an objective lens relative to the two-layer disc to bring the objective lens into focus to a focused point (hereinafter referred to focused focal point) at a position of an objective lens for each recording layer based on a focus error signal. This interlayer movement of a focused focal point (hereinafter referred to interlayer jump) is disclosed in, for example, JP-A-H09-50630 and JP-A-11-345420.

SUMMARY OF THE INVENTION

Figure 2A:
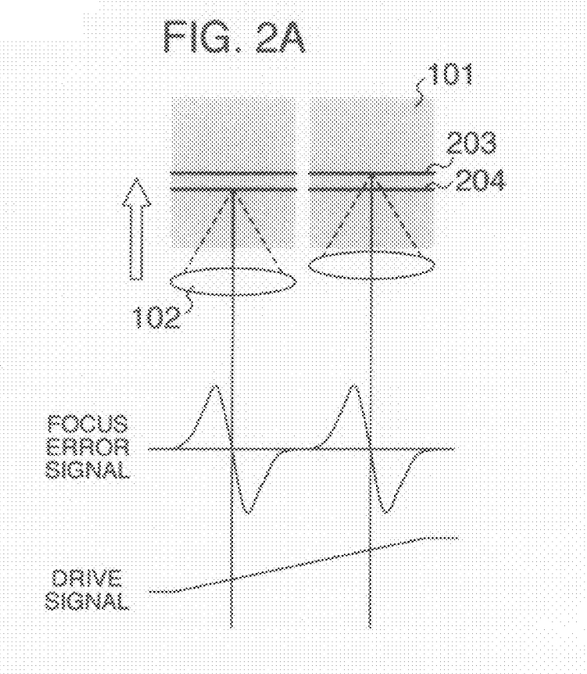
FIGS. 2A and 2B are diagrams showing focus error signals caused by the movement of a focal point on an optical disc that has a plurality of recording layers.

The access to each recording layer of the disc having two layers on one surface thereof can be made by controlling the drive of the objective lens by an optical head. An example is shown in FIG. 2A. In FIG. 2A, if the level of the drive signal of the objective lens 102 is gradually heightened, then the objective lens 102 moves in a direction closer to the disc. In a focus error signal, as the optical lens moves, a focused focal point appears for each of a second recording layer 204 and a first recording layer 203.

Blu-ray Disc, HD-DVD or the like, which uses a blue laser to perform high-density recording, has a recording capacity per one recording layer, 3 to 5 times larger than conventional DVD discs. Furthermore, it has a plurality of recording layers on one disc and has increased the recording capacity. Additionally, a disc has been invented that has three layers or more with a view to obtaining an even larger capacity. In such a disc that has three recording layers or more, if there exists another recording layer between a recording layer which is now subjected to a focal point control and a recording layer which is subsequently to be subjected to the focal point control, it is conceivable that the focal point position is moved at one stroke to a target recording layer by just passing through the recording layer on the way. This aims at an efficient interlayer jump in order to shorten an access time.

Moreover, in a disc that has a plurality of recording layers, optical sensitivity may differ for each recording layer due to a difference in material and structure used therefor.

The optical disc unit learns light intensity that is appropriate to recording or reproduction, and causes the laser to emit a light with optimum light intensity, thus recording and reproducing information. Therefore, the difference in light sensitivity between recording layers may cause a problem. If, for example, a laser light with light intensity appropriate to a recording layer that has a low optical sensitivity is irradiated to a recording layer that has a high optical sensitivity, then the physical state of the recording layer that has a high optical sensitivity could be changed, and it may lead to a deterioration in data recorded thereon.

Figure 2B:
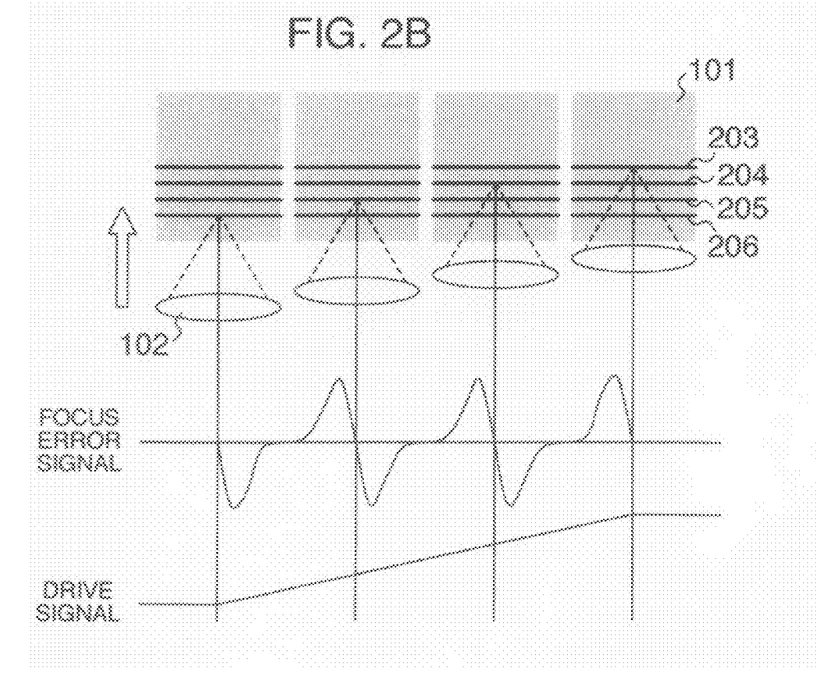

For example, in an optical disc having four recording layers as represented by an example shown in FIG. 2B, it is assumed that the focal point position moves from a fourth recording layer 206 to a first recording layer 203.

The relationship of optical sensitivity between each recording layer is represented, for example, as follows:

(fourth or first recording layer)<(third or second recording layer)

In other words, the relationship of optimum light intensity between the recording layers is as follows:

(fourth or first recording layer)>(third or second recording layer)

In the optical disc that has recording layers that differ in optical sensitivity as described above, if the light intensity at a focal point is optimum to the fourth recording layer 206 or first recording layer 203 during movement of the focal point position between recording layers, then the information recorded on the third recording layer 205 or second recording layer 204 could be deteriorated during the passage of the focal point through the third recording layer 205 or second recording layer 204.

It is, therefore, an object of the present invention to provide an optical disc and an optical disc unit that solve the foregoing problem. The foregoing problem is solved by the following means.

The present invention provides a correction unit. In an interlayer jump operation on the optical disc that has a plurality of recording layers, when a laser light moves from a recording layer on which the laser light is now focused to another recording layer that is not adjacent, the correction unit corrects, during the movement of the focal point, the light intensity or light density at a focal point and reduces the light intensity or light density at the focal point in accordance with the recording layer to be passed through.

The present invention prevents the data recorded on the disc from being deteriorated by the interlayer jump operation.

Other objects, features and advantages of the invention will become apparent from the following description of the embodiments of the invention taken in conjunction with the accompanying drawings.

DESCRIPTION OF THE EMBODIMENTS

Embodiments of the present invention will be described in the following.

Embodiment 1

One embodiment of the present invention will be described with reference to FIG. 1.

Figure 1:
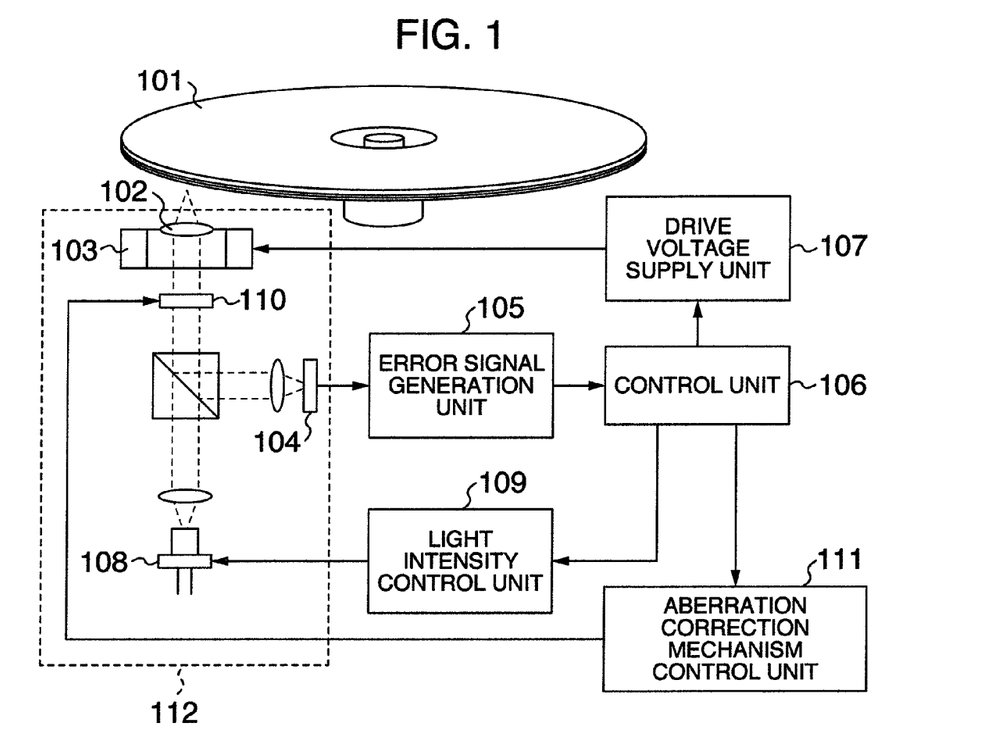
FIG. 1 is a block diagram of an optical disc unit for recording or reproducing information on and from an optical disc that has a plurality of recording layers.

In FIG. 1, 101 is an optical disc that has a plurality of recording layers that can be accessed from one surface thereof. 102 is an objective lens for focusing a laser light on recording layers of the disc. 103 is a movement unit for moving the objective lens 102. 104 is a photo receiver for receiving a laser light reflected from the optical disc. 105 is an error signal generation unit for generating a focus error signal that represents a displacement between a laser light focus point on the disc and the recording layer from the laser light received by the photo receiver 104. 106 is a control unit for generating a drive signal for driving the movement unit 103. 107 is a drive voltage supply unit for supplying the movement unit 103 with a drive voltage in accordance with the drive signal. 108 is a laser. 109 is an intensity control unit for controlling the intensity of the laser 108. 110 is an aberration correction mechanism for correcting the aberration of the focus on the disc. 111 is an aberration correction mechanism control unit for operating the aberration correction mechanism 110 to correct aberration.

In FIG. 1, 102-104, 108 and 110 constitute an optical head. Further, 109 may be included to constitute the optical head.

In the unit shown in FIG. 1, the objective lens 102 focuses laser light emitted from the laser 108 on the optical disc 101 to achieve a focus.

Now, description will be given to a position control when a focal point is positioned on one recording layer by illustrating an example. A laser light that is reflected from the optical disc 101 is received by the photo receiver 104. The error signal generation unit 105 generates a focus error signal from the received later light. The control unit 106 generates a drive signal in accordance with the focus error signal. The drive voltage supply unit 107 supplies the movement unit 103 with voltage in accordance with the drive signal, moves the position of the objective lens, and corrects the focal point position. The focal point position is precisely controlled by feeding back the deviation between the focal point and recording layer to the lens position in this manner.

Here, with reference to FIG. 2B, an example of an interlayer jump will be described, in which after position control to a certain recording layer, the focal point is moved to another recording layer, and position control is executed for the recording layer to which the focal point is moved.

In FIG. 2B, the optical disc 101 has four recording layers, 203 as a first recording layer, 204 as a second recording layer, 205 as a third recording layer, and 206 as a fourth recording layer. By moving the objective lens 102, a focal point is positioned on each recording layer.

Here, a case is considered, as an example, in which the objective lens 102 is moved and a focal point is moved from a position on the fourth recording layer 206 to a position on the first recording layer 203. When the objective lens 102 moves, the feedback control for making a follow-up control of the focal point on the recording layer mentioned before is not used or the lens position is moved under a different control. As the focal point moves from one recording layer to another, the focus error signal that is generated from the light reflected from the disc changes as shown in FIG. 2B. More specifically, at a position where the fourth recording layer 206 is in focus, the focus error signal is at nearly the center of amplitude. As the objective lens 102 is moved from there towards the first recording layer 203, it generates an error signal in accordance with a distance between the focal point and fourth recording layer 206. When the focal point gets near the third recording layer 205, it generates an error signal in accordance with the displacement between the focal point and third recording layer 205. When the focal point position is moved from the fourth recording layer 206 to first recording layer 203 in this manner, the focal point passes through the third recording layer 205 and second recording layer 204, and it generates a focus error signal near the recording layers in accordance with a positional relationship between each recording layer and the focal point.

As illustrated above, when the focal point is moved from the fourth recording layer 206 to the first recording layer 203, the focus error signal changes during the passage through the recording layers. Therefore, it is possible to know an approximate focal point position that is on the move by observing the change.

In addition to the above method of observing the error signal, it is also possible to know an approximate position to which the focal point is moved by means of a moving time if the lens is moved at a constant velocity. Therefore, a time-based position control is also conceivable.

For example, if it is assumed that a moving velocity of the objective lens is V (μm/second), and a distance between the first recording layer and fourth recording layer is D (μm), then the time T required for the movement of the focal point from the first recording layer to the fourth recording layer is D/V (second). For example, if the first to fourth recording layers exist equidistantly, the time required for the focal point to reach the second, and third recording layer after the movement starts is T/3 (second) and 2×T/3 (second), respectively, thus making it possible to know the focal point on each recording layer from a driving time.

The positional information of the focal point that is on the move is obtained in this manner, and when the focal point position moves to a position near the first recording layer 203, the feedback servo control is resumed at that position. In other words, it is possible to position the focal point on the first recording layer 203 by controlling the above described positioning of the focal point.

In the optical disc having a plurality of recording layers as illustrated above, when the focal point position moves between recording layers that are not adjacent to each other, the focal point passes through one or more recording layers. This could deteriorate the information recorded on each recording layer during the passage of the focal point through each of the recording layers due to different optical sensitivity or the like of each recording layer.

The unit shown in FIG. 1 changes the laser light intensity at the focal point as the focal point moves from one recording layer to another in order to prevent such a deterioration in the information.

During the movement from one recording layer to another, the objective lens 102 is moved as described by the example shown in FIGS. 2A and 2B. In this event, the control unit 106 causes the drive voltage supply unit 107 to supply voltage. During the movement of the objective lens 102, the focal point passes through the recording layers. Therefore, the laser light intensity at the focal point is reduced.

Methods of reducing the laser light intensity at the focal point include causing the light intensity control unit 109, which supplies voltage or current to the laser 108, to reduce the amount of voltage or current supplied to the laser 108. This reduces the emission intensity of the laser 108, leading to reduced light intensity at the focal point.

Furthermore, the methods include causing the aberration correction mechanism control unit 111 to control the aberration correction mechanism 110, which corrects the aberration of the laser light at the focal point, to increase the aberration at the focal point, and thereby to decrease the intensity of the laser light at the focal point.

Figure 3A:
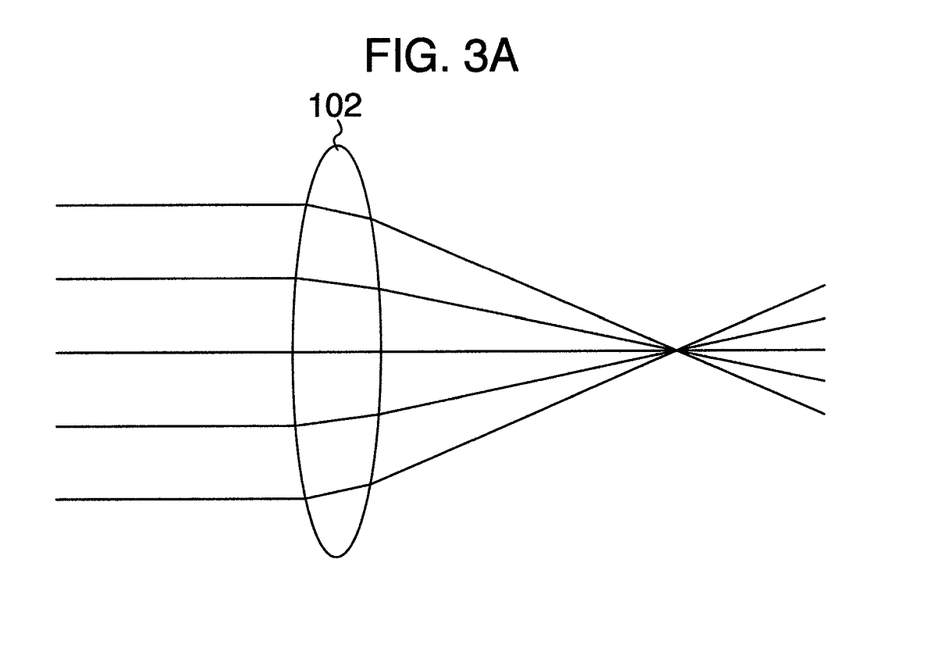
FIGS. 3A and 3B are diagrams showing a difference in focal point of the laser beam due to aberration.
Figure 3B:
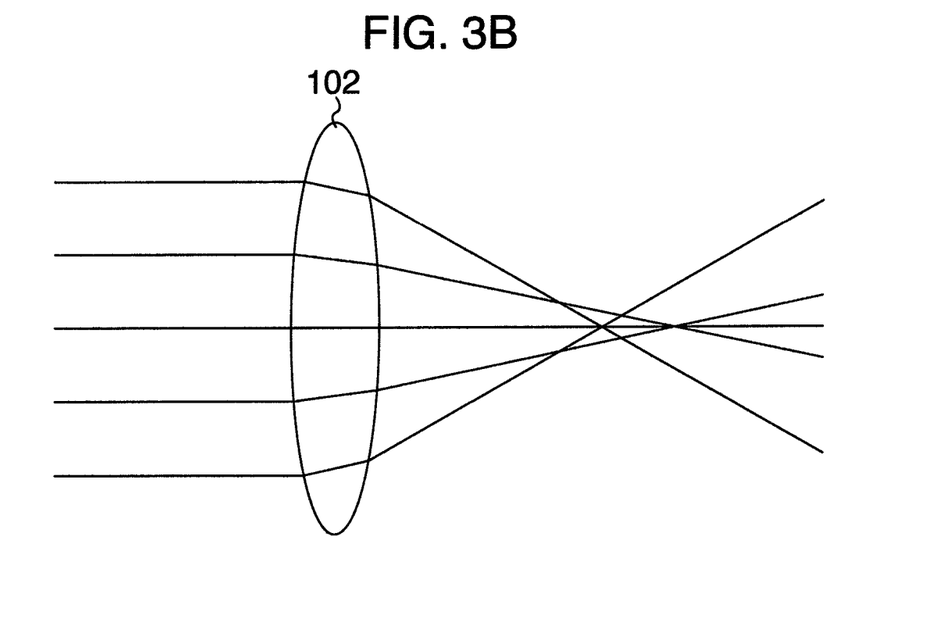

FIGS. 3A and 3B illustrate a reduction in laser light intensity at the focal point due to aberration. FIG. 3A shows an example in which there is no aberration. The laser light fluxes that pass through the outer area and inner area of the objective lens are concentrated on substantially one point, thus light density at the focal point being high. In contrast, in FIG. 3B, laser light fluxes that pass through the outer area of the objective lens are concentrated on a position near the objective lens compared with laser light fluxes that pass through the inner area of the object lens. Since the light is focused at a different distance in accordance with the laser light component, the light density at the focal point is lower than when there is no aberration.

The aberration correction mechanism 110 is provided to correct the aberration caused by a variation in plate thickness or the like for each optical disc. The aberration correction mechanism 110 can be used to reduce the light density during interlayer jump.

A typical example of the aberration correction mechanism 110 includes a lens for correcting aberration provided in a laser light path, and a liquid crystal element for changing the characteristic of laser light within a laser cross section.

Moreover, a control method is also conceivable in which light intensity is controlled in stages with reference to positional information of the focal point or the time information from the start of the drive in accordance with the movement of the focal point without the necessity to keeping constant the intensity of the laser light at the focal point during the movement of the focal point between the recording layers.

While an optical disc that has four recording layers is given as an example in the present embodiment, the present invention is also applicable to an optical disc that has three or more recording layers, and the number of the recording layers is not limited thereto.

Embodiment 2

Figure 4:
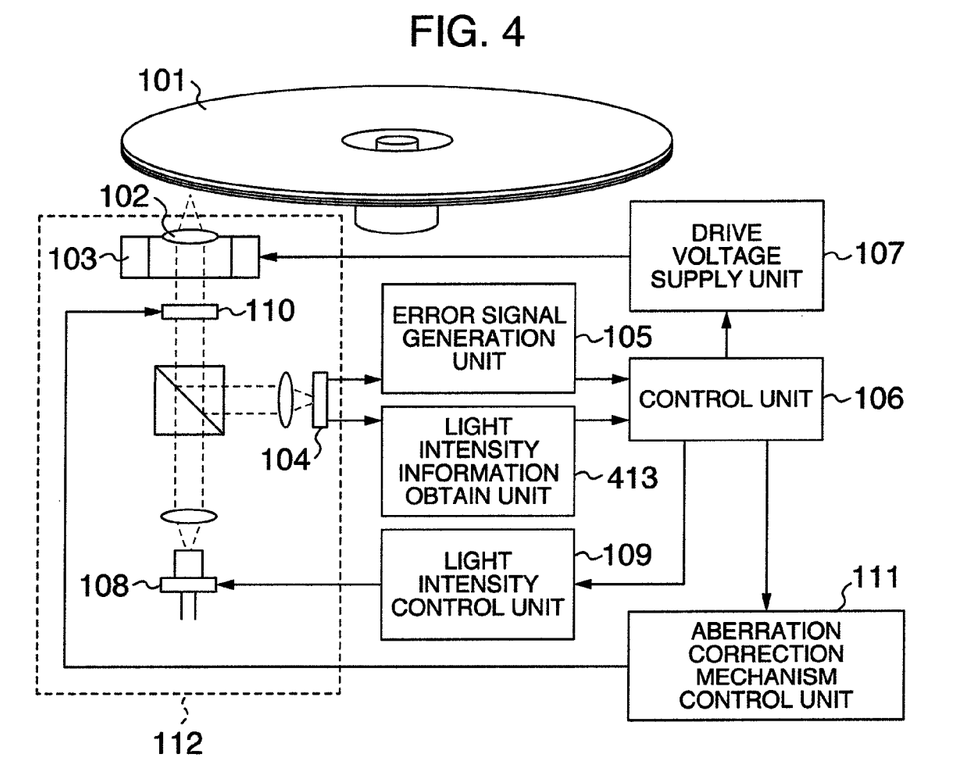
FIG. 4 is a block diagram of an optical disc unit that has a unit for obtaining optical sensitivity information of an optical disc that has a plurality of recording layers.

FIG. 4 shows another embodiment of the present invention.

In FIG. 4, 413 is an optical sensitivity obtaining unit for obtaining sensitivity information of a recording layer relative to a laser light. The same or equivalent components to those shown in FIG. 1 are designated by the same reference numerals, and a repeated description is omitted here.

The unit shown in FIG. 4 is an optical disc unit in which a focal point can be positioned on each recording layer of the optical disc 101 that has a plurality of recording layers as is the case with Embodiment 1.

The optical sensitivity obtaining unit 413 obtains optical sensitivity information of recording layers by the reflected laser light from the optical disc that is obtained by a photo receiver 104.

An exemplary method of obtaining the optical sensitivity information will be illustrated. The exemplary method includes one in which data is recorded on the recording layers by different light intensity, and optical sensitivity information is learned and obtained by a reproduction signal or reproduction quality of the data when the data is reproduced. The optical sensitivity of each recording layer relative to the different light intensities enables the estimation of a light intensity that is appropriate to the reproduction of data on each recording layer or a light intensity that does not deteriorate the data recorded on the recording layers.

In the embodiment of FIG. 4, during the movement of the focal point from one recording layer to another, the light intensity control unit 109 reduces the emission intensity of the laser 108 based on the optical sensitivity information. The aberration correction mechanism control unit 111 may cause the aberration correction mechanism 110 to correct the aberration and reduce the light density of the laser light at the focal point.

The optical sensitivity information obtained in this manner is recorded on the optical disc 101 as data. In this event, an area that is provided on the inner area or outer area of the disc and is used for adjusting the laser intensity may be employed for a storage area on the optical disc 101 for recording the data. Alternatively, a special storage region may be provided.

Figure 6:
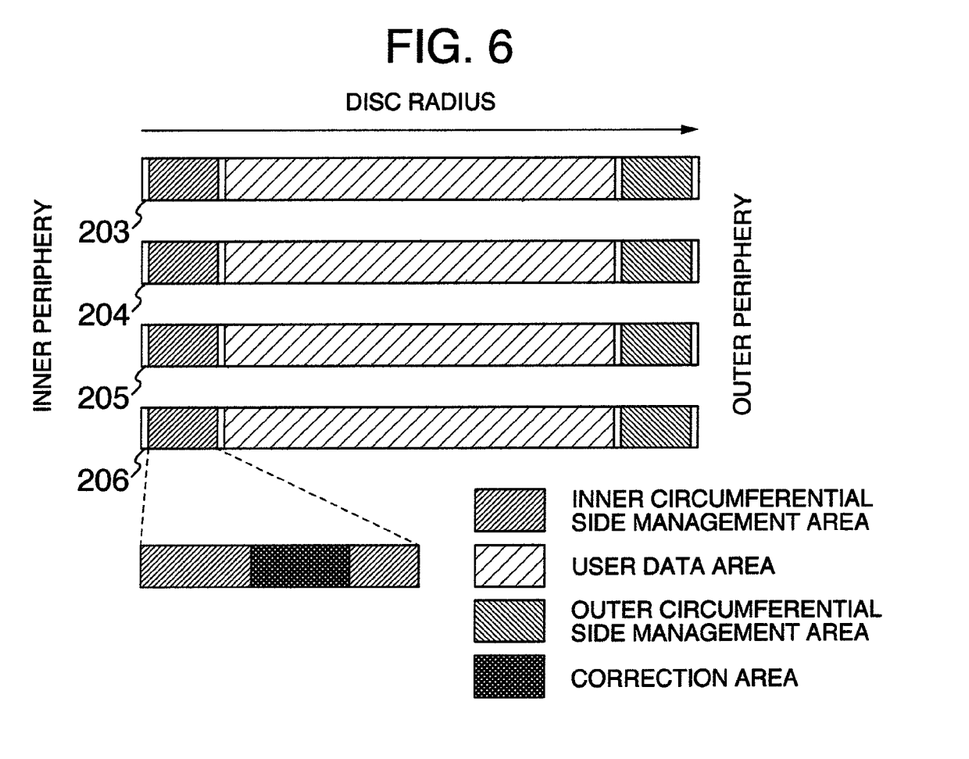
FIG. 6 is a diagram showing a data structure in an optical disc having a plurality of recording layers.

FIG. 6 illustrates storage areas for the data.

FIG. 6 shows a configuration of disc regions on an optical disc that has four recording layers. Description of components that are designated by the same reference numerals as those in FIG. 2 is omitted here. Each recording layer has a management area on the inner circumferential side of the disc, a user data area, and a management area on the outer circumferential side. An correction area on the inner circumferential side is disposed within the management area on the inner circumferential side of the disc. Optical sensitivity information can be obtained without deteriorating the data recorded on the user data area by learning data in the inner circumferential side management area or in the outer circumferential side management area. Moreover, deterioration of control data can be prevented by learning the data in the correction area that is included in the inner circumferential side management area.

The optical sensitivity information obtaining unit 413 may obtain the optical sensitivity information by reproducing the optical sensitivity information that is recorded on the optical disc 101 as data. This enables the information to be obtained in a shorter time than by the method of obtaining the optical sensitivity information by recording and reproducing data.

The learned data is also recorded on an inner circumferential side management area or on an outer circumferential side management area of the fourth recording layer 206 which is nearest the disc surface on the side of the objective lens. Therefore, the reproduction of the data would enable the optical sensitivity information to be obtained before the focal point passes through the recording layer, thus making it possible to prevent deterioration in the data on the optical disc in a more reliable manner.

Embodiment 3

Figure 5:
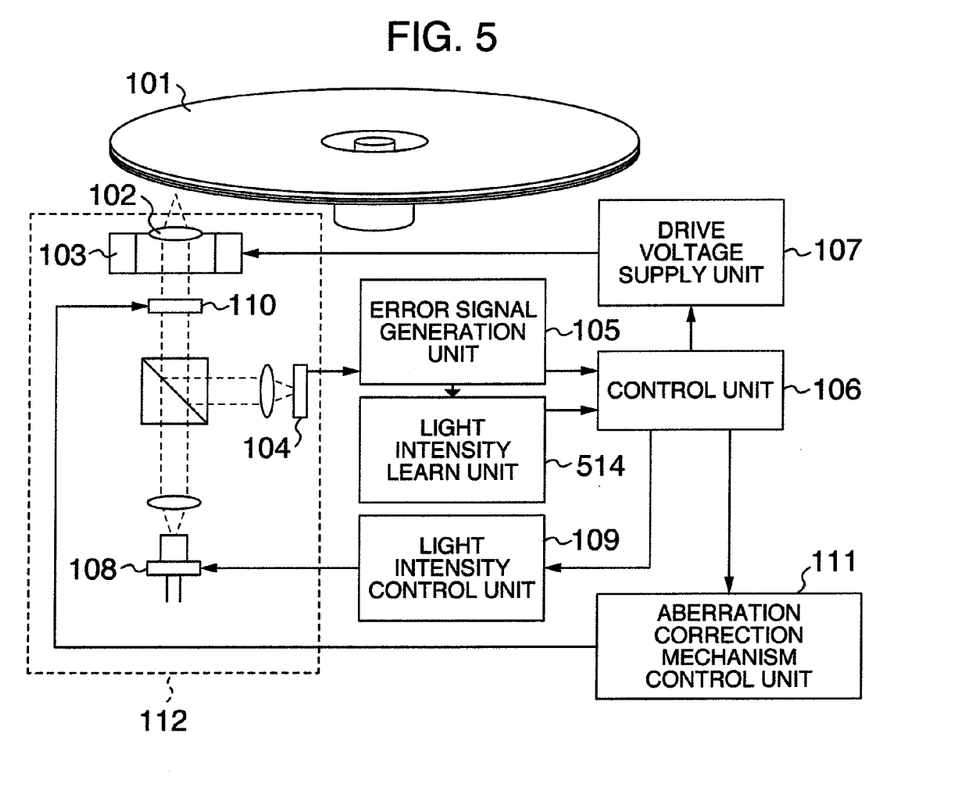
FIG. 5 is a block diagram of an optical disc unit that learns information on light intensity relative to a focus error signal of an optical disc having a plurality of recording layers.

FIG. 5 shows another embodiment of the present invention.

In FIG. 5, 514 is a light intensity learning unit. Other units equivalent to those shown in FIG. 1 are designated by the same reference numerals, and repeated description is omitted here.

A unit shown in FIG. 5 is an optical disc unit that is capable of positioning a focal point on each recording layer of an optical disc 101 that has a plurality of recording layers as is the case with Embodiment 1.

A deterioration in recorded information, during the passage of a focal point of a laser light through the recording layers, is suppressed by causing a light intensity control unit 109 to control the emission intensity of a laser 108 during an interlayer jump, and by causing an aberration correction mechanism control unit 111 and an aberration correction mechanism 110 to control the aberration at the laser light focal point. In contrast, when a position control is made by a focus error signal, the light intensity of the laser light at the focal point that is reduced by the foregoing method needs to be high enough to provide a sufficient amplitude of the focus error signal.

Therefore, the optical disc unit is configured to learn a light intensity that enables the sufficient amplitude of the focus error signal to be obtained by the light intensity learning unit 514.

The light intensity learning unit 514 observes the error signal generated by the error signal generation unit 105 during a time period when the movement unit 103 is moved by the drive voltage supply unit 107, and obtains the amplitude of the error signal.

A control unit 106 changes the light intensity information of the laser light or the state of the aberration mechanism in such a manner that light intensity or light density at the focal point will be reduced. When the movement unit 103 is moved in the vicinity of each recording layer, the light intensity learning unit 514 learns the light intensity information of the laser light or the state of the aberration mechanism that gives the least light intensity or light density for enabling a sufficient amplitude of the error signal to be obtained.

The light intensity control unit 109 reduces the emission intensity of the laser 108 during the movement of the focal point between recording layers based on the learned laser light intensity. Alternatively, the aberration correction mechanism control unit 111 causes the aberration correction mechanism 110 to correct the aberration of the laser light focal point based on the learned aberration, thus reducing the light density at the focal point.

The learned result is also recorded on the optical disc as data in the present embodiment in the same manner as in Embodiment 2. The data may be recorded in areas provided on inner and outer circumferences of the disc in the same manner as in Embodiment 2.

The light intensity learning unit 514 may also obtain the learned result by reproducing the information of the learned result that is recorded on the optical disc as data.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical disc unit that records or reproduces data on and from an optical disc that has N number of recording layers (N is an integer equal to or larger than 3), comprising:
   an objective lens for focusing a laser light on the disc and positioning a focal point of laser light;
   error signal generating unit for generating a signal indicative of a focus error on the recording layers from a reflection light from the optical disc;
   drive unit for driving said objective lens in a direction perpendicular to the recording layers of the disc in accordance with the error signal; and
   correction unit for correcting the light intensity or light density at the focal point of the laser light that is generated by the objective lens, wherein:
   in the focal point position movement in which said drive unit drives said objective lens, and the focal point is moved from one recording layer to another based on the focus error signal that is detected by said error signal generation unit, when the focal point moves from one recording layer on which the laser light is focused to another layer that is not adjacent, and when the number of the recording layers to be passed through is one or more, said correction unit corrects the light intensity or light density at the focal point on the recording layer to be passed through.

2. The optical disc unit according to claim 1, wherein:
   said correction unit is a control unit for controlling a drive current or a drive voltage of the laser, and corrects light intensity at the focal point by controlling an optical output of the laser.

3. The optical disc unit according to claim 1, wherein:
   said correction unit is a unit for correcting the aberration of the focal point of the laser light generated by said objective lens, and corrects light density of the laser light at the focal point by controlling the aberration on the recording layer to be passed through.

4. The optical disc unit according to claim 1, wherein:
   the light intensity of the laser light at the focal point in motion that is corrected by said correction unit is as low as or lower than the lowest light intensity of laser light intensities that are optimum for each recording layer when reproducing information that is recorded on a recording layer before the focal point moves, a recording layer on which the focal point is going to be positioned, and a recording layer through which the focal point passes during the movement thereof.

5. The optical disc unit according to claim 1, comprising:
   focal position detecting unit for detecting a focal point position of a laser light, wherein:
   said correction unit corrects the light intensity of the laser light at the focal point in accordance with the focal point position information detected by said focal position detection unit during the movement of the focal point.

6. The optical disc unit according to claim 1, comprising:
   optical sensitivity information obtain unit for obtaining optical sensitivity information of each recording layer, wherein:
   said correction unit corrects the light intensity of the laser light at the focal point in accordance with said optical sensitivity information of a recording layer through which the focal point is going to pass during the movement thereof.

7. The optical disc unit according to claim 1, comprising:
   optical sensitivity information obtain unit for obtaining optical sensitivity information of each recording layer, wherein:
   said optical sensitivity information is recorded on said optical disc.

8. The optical disc unit according to claim 1, comprising:
   optical sensitivity information obtain unit for obtaining optical sensitivity information of each recording layer, wherein:
   said optical sensitivity information is recorded on a recording layer nearest said objective lens of a plurality of recording layers possessed by said optical disc.

9. A method of controlling an optical disc unit of an optical disc that has N number of recording layers (N is an integer equal to or larger than 3), comprising:
   an error signal generating step of generating a signal indicative of a focus error on a recording layer from a reflected light from the disc by use of an objective lens for focusing a laser light on the disc;
   a drive step of driving the objective lens in a direction perpendicular to the recording layers of the disc in accordance with the error signal; and a correction step of correcting light intensity or light density of a laser light at a focal point that is generated by the objective lens, wherein:

in the focal point position movement in which said drive step drives said objective lens, and the recording layer is changed based on the focus error signal that is detected by said error signal generation unit, when the focal point moves from one recording layer on which the laser light is focused to another layer that is not adjacent, and when the number of the recording layers to be passed through is one or more, said correction unit corrects the light intensity or light density at the focal point in accordance with the recording layer to be passed through.

* * * * *